United States Patent
Ho et al.

(10) Patent No.: US 9,212,741 B1
(45) Date of Patent: Dec. 15, 2015

(54) CONTROL OF SPEED-RATIO SELECTION IN AN AUTOMATIC TRANSMISSION

(71) Applicant: GM GLOBAL TECHNOLOGY OPERATIONS LLC, Detroit, MI (US)

(72) Inventors: Jay Ho, Novi, MI (US); David William Minner, Pinckney, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/337,506

(22) Filed: Jul. 22, 2014

(51) Int. Cl.
| | |
|---|---|
| *G06F 17/00* | (2006.01) |
| *F16H 61/02* | (2006.01) |
| *F16H 61/18* | (2006.01) |
| *F16H 59/36* | (2006.01) |
| *F16H 59/70* | (2006.01) |

(52) U.S. Cl.
CPC ............ *F16H 61/0213* (2013.01); *F16H 59/36* (2013.01); *F16H 59/70* (2013.01); *F16H 61/18* (2013.01); *F16H 2059/366* (2013.01); *F16H 2061/0232* (2013.01); *F16H 2061/0244* (2013.01)

(58) Field of Classification Search
None
See application file for complete search history.

(56) References Cited

U.S. PATENT DOCUMENTS

| 7,476,177 | B2 * | 1/2009 | Sakamoto | 477/34 |
| 8,180,550 | B2 * | 5/2012 | Oshima et al. | 701/90 |
| 8,423,222 | B2 * | 4/2013 | Hisada et al. | 701/22 |

* cited by examiner

*Primary Examiner* — Dirk Wright
(74) *Attorney, Agent, or Firm* — Quinn Law Group, PLLC

(57) ABSTRACT

A method of controlling an automatic transmission connected to an engine in a motor vehicle employs a switch for requesting selection of transmission speed-ratio ranges. According to the method, the switch receives an input signal and generates an output signal having the same duration as the input signal. A controller programmed with an engine threshold speed and a threshold signal duration receives and compares the output signal with the threshold signal duration. The controller also determines a current transmission speed-ratio range and a transmission threshold speed-ratio range that is defined by engine's threshold speed. The controller additionally commands the transmission to change the current speed-ratio range to a neighboring speed-ratio range if the signal duration is less than or equal to the threshold. Furthermore, the controller commands the transmission to change the current speed-ratio range to the threshold speed-ratio range if the signal duration is greater than the threshold.

20 Claims, 2 Drawing Sheets

CONTROL OF SPEED-RATIO SELECTION IN AN AUTOMATIC TRANSMISSION

TECHNICAL FIELD

The disclosure relates to control of speed-ratio selection in an automatically-shiftable transmission for a motor vehicle.

BACKGROUND

Modern passenger vehicles frequently include a powertrain that includes an engine, a multi-speed automatically-shiftable or automatic transmission, and a differential or final drive. An automatic multi-speed transmission increases the overall operating range of the vehicle by permitting the engine to operate through its torque range multiple times without requiring an operator of the vehicle to manually select specific speed-ratios or gear ranges. The number of forward gear ranges that are available in the transmission determines the number of times the engine torque range is repeated. An automatic transmission such as above may utilize an epicyclic or planetary gearing, or a parallel shaft mounted gear-train, such as in a Dual-Clutch transmission (DCT), for affecting specific transmission speed-ratios.

Modern automatic transmissions are typically controlled by an electronic controller, which may either be a dedicated transmission control unit (TCU) or powertrain control module (PCM) configured to control the entire powertrain, including the engine. The appropriate controller generally uses data provided by sensors from various vehicle systems to calculate how and when to change gears in the vehicle for optimum performance, fuel economy, and shift quality. Although such a controller is generally programmed to select the subject transmission's gear ranges automatically, frequently, modern automatic transmissions also offer to the vehicle operator the option of manual control over the selection of specific gear ranges.

SUMMARY

A method of controlling a multiple speed-ratio automatically-shiftable transmission operatively connected to an engine in a powertrain of a motor vehicle is disclosed. The vehicle includes a switch that is configured to request speed-ratio range selection in the transmission via a signal. The method includes receiving via the switch an input signal having a specific determinable duration. The method also includes generating via the switch an output signal having the duration of the input signal. The vehicle also includes a controller in operative communication with each of the switch and the transmission and programmed with a threshold speed of the engine and a threshold duration for the output signal received from the switch. The method also includes receiving the output signal and comparing the duration of the output signal with the threshold signal duration via a controller. The method additionally includes determining a current speed of the engine and a current road speed of the vehicle via a controller.

The method also includes determining via the controller a currently selected or current speed-ratio range in the transmission corresponding to the determined current speed of the engine and current road speed of the vehicle. The method additionally includes determining via the controller a threshold speed-ratio range in the transmission that is defined by the threshold speed of the engine. The method also includes commanding the transmission via the controller to change the current selected speed-ratio range by one to a neighboring speed-ratio range if the duration of the output signal is less than or equal to the threshold output signal duration. Furthermore, the method includes commanding the transmission via the controller to change the current selected speed-ratio range to the threshold speed-ratio range if the duration of the output signal is greater than the threshold output signal duration.

The input signal may be a request for the transmission to upshift. In such a case, the threshold speed of the engine may be a minimum permitted engine speed and the threshold speed-ratio range may include a lowest permitted transmission speed-ratio.

The method may also include receiving via the switch an additional request for the transmission to upshift following the command to the transmission to change the currently selected speed-ratio range to the threshold speed-ratio range. In such a case, the method may additionally include denying via the controller the additional request for the transmission to upshift. Additionally, the method may include generating via the controller a signal that is indicative of the additional request for the transmission to upshift having been denied.

The input signal may also be a request for the transmission to downshift. In such a case, the threshold speed of the engine may be a maximum permitted engine speed and the threshold speed-ratio range may include a highest permitted transmission speed-ratio.

The method may also include receiving via the switch an additional request for the transmission to downshift following the command to the transmission to change the currently selected speed-ratio range to the threshold speed-ratio range. In such a case, the method may additionally include denying via the controller the additional request for the transmission to downshift. Furthermore, the method may include generating via the controller a signal that is indicative of the additional request for the transmission to downshift having been denied.

The vehicle may include a transmission shift selector configured to control operation of the transmission, and the switch may be arranged on the transmission shift selector. The vehicle may also include a steering column and a steering wheel rotatably mounted on the steering column. In such case, the switch may be arranged on one of the steering wheel and the steering column.

The threshold duration for the input signal may be in the range of 500-1000 milliseconds.

A system for controlling a multiple speed-ratio range automatically-shiftable transmission operatively connected to an engine in a powertrain of a motor vehicle is also disclosed.

Additionally, a motor vehicle powertrain having an engine, a multiple speed-ratio automatically-shiftable transmission configured to transmit torque of the engine, and a controller programmed to execute the above disclosed method is disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
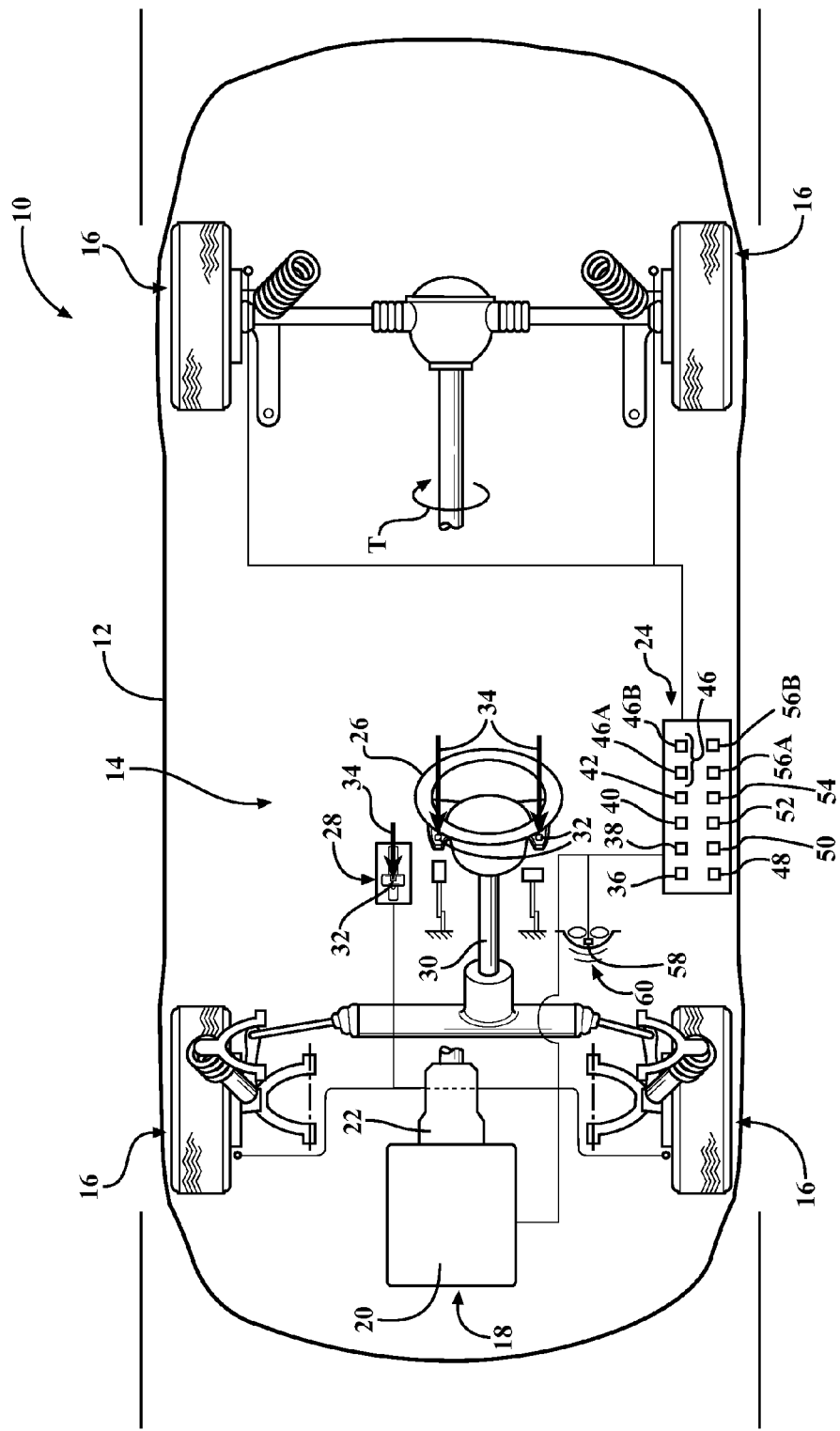
FIG. 1 is a schematic illustration of a vehicle employing a powertrain that includes an internal combustion engine connected to an automatic transmission.

Referring to the drawings, wherein like reference numbers refer to like components, FIG. 1 illustrates a vehicle 10 that includes a vehicle body 12 that defines a vehicle interior or passenger compartment 14. The vehicle 10 also includes a plurality of road wheels 16 and a powertrain 18 configured to launch and propel a vehicle, i.e., operate the vehicle in all speed-ratio ranges between low and high road speeds.

The powertrain 18 includes an internal combustion engine 20 for generating engine torque T and may also include a variety of additional power sources, such as one or more electric motor/generators (not shown). The powertrain 18 also includes a multiple speed-ratio automatically-shiftable, a.k.a., automatic, transmission 22 operatively connecting the engine 20 to at least some of the wheels 16 for transmitting engine torque thereto. The vehicle 10 also includes an electronic control unit (ECU) or controller 24. The controller 24 is operatively connected to the powertrain 18 in order to control and coordinate operation of the engine 20 and the transmission 22. Each of the engine 20 and transmission 22 may also be separately controlled by a respective engine controller and a transmission control unit, which would also be programmed to communicate with each other to affect overall control of the powertrain 18. However, for simplicity, the present disclosure will be limited to describing control of the powertrain 18 via the controller 24.

Arranged inside the passenger compartment 14 are a variety of mechanical, electrical, and electro-mechanical devices configured to control operation of the vehicle and its various subsystems. As shown in FIG. 1, such devices include a steering wheel 26 and a transmission shift selector 28 for controlling operation of the transmission 22. As known by those skilled in the art, the steering wheel 26 is typically rotatably mounted in the vehicle 10 on a steering column 30 and is configured to turn at least some of the wheels 16. As similarly known by those skilled in the art, the transmission shift selector 28, which may be a mechanical control lever or electro-mechanical switch, is configured, i.e., designed and constructed, to be manipulated by an operator of the vehicle 10 for selecting among operating modes, speed-ratio ranges, and/or specific speed-ratios of the transmission 22. Specific operating modes of the transmission 22 may include a forward or drive mode in which engine torque can be employed to move the vehicle 10 in one direction, a reverse mode in which engine torque can be employed to move the vehicle in a direction that is opposite to that of the drive mode, and a neutral mode in which no engine torque can be transmitted to the wheel(s) 16. The transmission 22 also includes a park mode in which the transmission blocks vehicle movement.

Typically, automatic transmissions, such as the transmission 22, include a gear-train that has input and output members or shafts and a number of gear elements, generally in the nature of one or more planetary gear sets, for coupling the input and output shafts. Traditionally, a related number of hydraulically actuated torque transmitting devices, such as clutches and brakes, are selectively engageable to activate the aforementioned gear elements for establishing desired forward and reverse speed ratios between the transmission's input and output shafts. The speed ratio is defined as the transmission input speed divided by the transmission output speed. The transmission input shaft is generally selectively connectable to the vehicle engine (e.g., through a fluid coupling device such as a torque converter), whereas the output shaft is connected through a "drive train" directly to the vehicle wheels.

Shifting from one speed ratio to another is typically performed in response to engine throttle and vehicle speed, and generally involves releasing one or more "off-going" clutches associated with the current or attained speed ratio, and applying one or more "on-coming" clutches associated with the desired or commanded speed ratio. To perform a "downshift", the transmission transitions from a low speed ratio to a high speed ratio. The downshift is accomplished by disengaging a clutch associated with the lower speed ratio, and contemporaneously engaging a clutch associated with the higher speed ratio, thereby reconfiguring the gear set to operate at the higher speed ratio. The selection of speed-ratios in the transmission 22 permits effective use of engine torque and extends operation of the engine 20 over a wide range of vehicle speeds. Typically, the controller 24 uses signals from various sensors connected to the engine 20, the transmission 22, and other vehicle systems, to determine when and how to shift between speed-ratios in the transmission.

The transmission 22 may include a number of specific speed-ratios in the drive mode. Such speed-ratios generally include a highest or first speed-ratio that provides the greatest multiplication of engine torque to effectively launch the vehicle 10 forward from a full stop. The highest speed-ratio is generally significantly greater than 1:1, and is typically greater than 3:1 in modern automatic transmissions. Other speed-ratios in the transmission 22 may be intermediate speed-ratio(s) that permit efficient use of available engine torque to propel the vehicle 10 in the drive mode at various road speeds. Such intermediate speed-ratio(s) may range from significantly greater than and up to 1:1. The transmission 22 may also include a lowest or top speed-ratio that reduces speed of the engine 20 to minimize engine noise and fuel consumption while employing sufficient engine torque to maintain vehicle forward progress at cruising speeds. Such a highest speed-ratio is frequently lower than 1:1. The transmission 22 may be controlled to select in the drive mode a specific speed-ratio range from a number of available speed-ratio ranges. Each of such available speed-ratio ranges defines a limited number of speed-ratios, such as a range that includes only the first and second speed-ratios, or a range that includes the first, second, and third speed-ratios, while locking out all the speed-ratios that are sequentially higher.

Available speed-ratios may also include a high speed-ratio, greater than 1:1, in the reverse mode that multiplies engine torque to effectively launch and move the vehicle 10 in reverse. To facilitate control of the transmission 22, the transmission shift selector 28 may include specific positions corresponding to the above-described operating modes, speed-ratio ranges, and/or individual speed-ratios, all of which may be defined by tactile detents, for selection by the operator of the vehicle 10. In other words, the transmission shift selector 28 may include predetermined positions that specifically select all the available speed-ratios in drive mode, all the speed-ratios in reverse mode, or neutral. Also, the transmission shift selector 28 may include predetermined positions for selecting specific ranges of available speed-ratios in drive mode, while locking out all the speed-ratios that are sequentially higher.

The vehicle 10 also includes a switch 32 configured to receive an input signal 34 indicative of a request for a transmission to perform a shift between speed-ratios, a.k.a., a gearshift. The input signal 34 is characterized by a time span or duration 36. The input signal 34 may be a request for the transmission 22 to upshift, i.e., to select a lower speed-ratio, or to downshift, i.e., to select a higher speed-ratio. The input signal 34 may be accomplished via an application of force by the vehicle's operator, such as by pressing the switch 32. The switch 32 is also configured to generate and communicate an output signal 38 to the controller 24 in response to the input signal 34 for the duration 36. Therefore, the output signal 38 is defined by the same duration 36 as the input signal 34. The controller 24 may include a timer 40 configured to assess the duration 36 of the output signal 38. Additionally, the controller 24 is configured to compare the duration 36 of the input and output signals 34, 38 versus a threshold output signal duration 42 programmed into the controller.

The time span at or below such threshold duration 42 is intended to be representative of the operator's intent to request a single speed-ratio change. Additionally, the time span above such threshold duration 42 is intended to be representative of the operator's intent to request the largest speed-ratio change that the transmission 22 is capable of delivering without compromising structural integrity or operational effectiveness of the powertrain 18. A too great of a speed-ratio change in the transmission 22 on a downshift may, for example, result in an over-speed of the engine 20 and cause structural damage to the engine, or on an upshift result in an engine stall. The threshold duration 42 may be determined during appropriate testing with a live vehicle operator. For example, the threshold duration 42 may be in the range of 500-1000 milliseconds.

The switch 32 may be arranged on the transmission shift selector 28. In the alternative, the switch 32 may be arranged on the steering wheel 26 or on the steering column 30. A duplicate switch 32 may also be arranged on the steering wheel 26 or on the steering column 30, in addition to the switch 32 on the shift selector 28. Switch 32 that is arranged on the steering wheel 26 or on the steering column 30 may be configured as a pair of shift paddles, wherein one shift paddle is configured to request an upshift and the other shift paddle is configured to request a downshift.

The previously described controller 24 is in operative communication with each of the switch 32 and the transmission 22. The controller 24 is programmed with a threshold speed 46 of the engine 20, and is configured to determine a current speed 48 of the engine 20 and a current road speed 50 of the vehicle 10. Such real-time determination of engine speed 48 and vehicle speed 50 may be facilitated by respective sensors (not shown, but known to those skilled in the art) arranged on the vehicle 10. For example, a hall-effect sensor positioned on the engine 20 may detect the engine's rotational speed, while a hall-effect sensor arranged proximate to one of the wheels 16 may detect road speed of the vehicle 10.

The controller 24 is also configured to determine in the transmission 22 in real-time a currently selected speed-ratio range (CR) 52 that corresponds to the determined current speed 48 of the engine 20 and current road speed 50 of the vehicle 10. The controller 24 is additionally configured to determine in the transmission 22 a threshold speed-ratio range (TR) 54 that is defined, i.e., bounded or limited, by the threshold speed 46 of the engine 20. In general, a speed-ratio range is thus limited by the threshold speed 46 when a different speed-ratio range would permit selection of speed-ratio in which unacceptably low or unacceptably high engine speed could result. As understood by those skilled in the art, an unacceptably low engine speed may result in the engine 20 experiencing a stall event, while an unacceptably high engine speed may result in structural damage of the engine.

According to the present disclosure, when the input signal 34 is a request for the transmission 22 to upshift, the threshold speed 46 of the engine 20 is defined as a minimum permitted engine speed 46A. In such a case, the TR 54 will be defined to include a lowest permitted transmission speed-ratio 56A, such as a sequentially third forward gear in the transmission 22. On the other hand, when the input signal 34 is a request for the transmission 22 to downshift, the threshold speed 46 of the engine 20 is a maximum permitted engine speed 46B. In such a case, the TR 54 will be defined to include a highest permitted transmission speed-ratio 56B, for example a sequentially second forward gear in the transmission 22. Accordingly, the controller 24 is programmed to distinguish between a request to upshift and a request to downshift the transmission 22 and identify the available TR 54 based on the threshold speed 46 of the engine 20.

The controller 24 is also configured to command the transmission 22 to change from the CR 52 by one to the neighboring or sequentially next speed-ratio range (NR)—either to one speed-ratio higher, as in the case of a downshift, or to one speed-ratio lower, as in the case of an upshift, in response to the first output signal 38 received from the switch 32. Additionally, the controller 24 is configured to command the transmission 20 to change from the CR 52 to the TR 54 in response to the second output signal 24 received from the switch 34. Accordingly, the controller 24 is configured to assess the duration 36 of the input signal 34 via the first and second output signals 38, 42 received from the switch 32, and control selection of speed-ratios and speed-ratio ranges in the transmission 22 correspondingly therewith.

The controller 24 is further configured to deny an additional request for the transmission 22 to upshift in the event that the switch 32 receives an additional request for the transmission to upshift following the command to the transmission to upshift from the CR 52 to the TR 54. The controller 24 is also configured to deny an additional request for the transmission 22 to downshift following the command to the transmission to downshift from the CR 52 to the TR 54 in response to the second output signal 42 received from the switch 32. Furthermore, the controller 24 may be additionally configured to generate a signal 58, such as by triggering a display on an instrument panel 60 of the vehicle 20. The signal 58 would serve to indicate that the additional request for the upshift or downshift has been denied (shown in FIG. 1).

Figure 2:
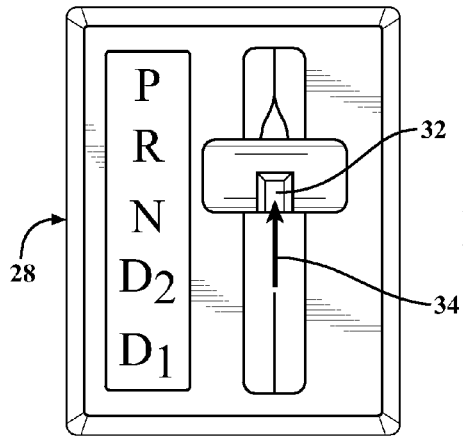
FIG. 2 is a schematic illustration of an embodiment of a switch configured for controlling operation of the automatic transmission shown in FIG. 1.
Figure 3:
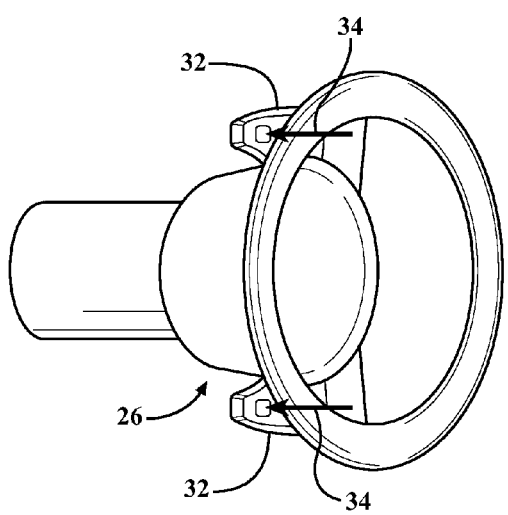
FIG. 3 is a schematic illustration of another embodiment of a switch configured for controlling operation of the automatic transmission shown in FIG. 1.
Figure 4:
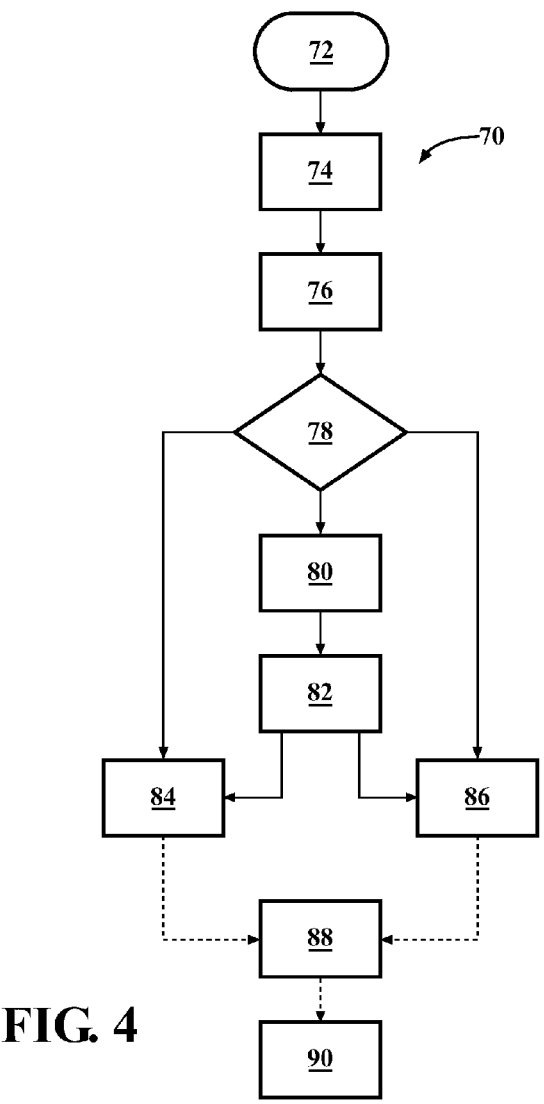
FIG. 4 is a flow diagram of a method of controlling the multiple speed-ratio automatically-shiftable transmission shown in FIG. 1 using the switches shown in FIGS. 2 and 3.

FIG. 4 depicts a method 70 of controlling the automatic transmission 22 in the powertrain 18 of the vehicle 10, as described above with respect to FIGS. 1-3. The method 70 is initiated in frame 72 with the vehicle 10 being motivated by torque of the engine 20. Following frame 72, the method 70 proceeds to frame 74, where it includes receiving via the switch 32 the input signal 34 that is indicative of a request for the transmission 22 to perform a gearshift. As described above, the input signal 34 is characterized by the duration 36. After frame 74, the method advances to frame 76. In frame 76 the method includes generating via the switch 32 the output signal 38 having the duration 36. From frame 76 the method proceeds to frame 78. In frame 78 the method includes receiving the output signal 38 and comparing duration 36 of the output signal to the threshold duration 42 via the controller 24.

After frame 78 the method advances to frame 80 for determining via the controller 24 the currently selected speed-ratio range (CR) 52 in the transmission 22 that corresponds to the determined current speed 48 of the engine 20 and current road speed 50 of the vehicle 10. Following frame 80, the method proceeds to frame 82. In frame 82, the method includes determining via the controller 24 the threshold speed-ratio range (TR) 54 in the transmission 20 that is defined by the threshold speed 46 of the engine 20 as programmed into the controller. After frame 82 the method advances to frame 84. In frame 84 the method includes commanding the transmission 22 via the controller 24 to change the CR 52 by one to the neighboring, sequentially next speed-ratio range (NR), if the duration 36 of the output signal 38 is less than or equal to the threshold output signal duration 40, based on the determination made in frame 78. On the other hand, if in frame 78 it was determined that the duration 36 of the output signal 38 is greater than the threshold output signal duration 42, in frame 86 the method includes commanding the transmission 22 via the controller 24 to change the CR 52 to the TR 54.

Following either frame 84 or 86 the method may proceed to frame 88. In frame 88 the method may include receiving via the switch 32 an additional request for a gearshift. If in frame 88 the request for the gearshift is a request for an upshift following the command for the transmission 22 to change the CR 52 to the TR 54, in frame 90 the method may include denying the additional request for the transmission to upshift and generating via the controller 24 the signal 58 indicative of the additional request for the upshift having been denied. If in frame 88 the request for the gearshift is a request for a downshift following the command for the transmission 22 to change the CR 52 to the TR 54, in frame 90 the method may include denying the additional request for the transmission to downshift and generating via the controller 24 the signal 58 indicative of the additional request for the downshift having been denied.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling a multiple speed-ratio automatically-shiftable transmission operatively connected to an engine in a powertrain of a motor vehicle, the method comprising:
   receiving via a switch an input signal having a duration and generating via the switch an output signal having the duration of the input signal, wherein the switch is arranged in the vehicle and configured to request speed-ratio range selection in the transmission;
   receiving the output signal and comparing the duration of the output signal with a threshold signal duration via a controller, wherein the controller is in operative communication with each of the switch and the transmission and is programmed with a threshold speed of the engine and the threshold output signal duration;
   determining a current speed of the engine and a current road speed of the vehicle via the controller;
   determining via the controller a currently selected speed-ratio range in the transmission corresponding to the determined current speed of the engine and current road speed of the vehicle;
   determining via the controller a threshold speed-ratio range in the transmission that is defined by the threshold speed of the engine;
   commanding the transmission via the controller to change the currently selected speed-ratio range by one to a sequentially next speed-ratio range if the duration of the output signal is less than or equal to the threshold output signal duration; and
   commanding the transmission via the controller to change the currently selected speed-ratio range to the threshold speed-ratio range if the duration of the output signal is greater than the threshold output signal duration.

2. The method of claim 1, wherein:
   the input signal is a request for the transmission to upshift;
   the threshold speed of the engine is a minimum permitted engine speed; and
   the threshold speed-ratio range includes a lowest permitted transmission speed-ratio.

3. The method of claim 2, further comprising:
   receiving via the switch an additional request for the transmission to upshift following said commanding the transmission to change the currently selected speed-ratio range to the threshold speed-ratio range; and
   denying via the controller the additional request for the transmission to upshift.

4. The method of claim 3, further comprising generating via the controller a signal indicative of the additional request for the transmission to upshift having been denied.

5. The method of claim 1, wherein:
   the input signal is a request for the transmission to downshift;
   the threshold speed of the engine is a maximum permitted engine speed; and
   the threshold speed-ratio range includes a highest permitted transmission speed-ratio.

6. The method of claim 5, further comprising:
   receiving via the switch an additional request for the transmission to downshift following said commanding the transmission to change the currently selected speed-ratio range to the threshold speed-ratio range; and
   denying via the controller the additional request for the transmission to downshift.

7. The method of claim 6, further comprising generating via the controller a signal indicative of the additional request for the transmission to downshift having been denied.

8. The method of claim 1, wherein the vehicle includes a transmission shift selector configured to control operation of the transmission, and wherein the switch is arranged on the transmission shift selector.

9. The method of claim 1, wherein the vehicle includes a steering column and a steering wheel rotatably mounted on the steering column, and wherein the switch is arranged on one of the steering wheel and the steering column.

10. The method of claim 1, wherein the threshold duration for the input signal is in the range of 500-1000 milliseconds.

11. A system for controlling a multiple speed-ratio automatically-shiftable transmission operatively connected to an engine in a powertrain of a motor vehicle, the system comprising:
    a switch arranged in the vehicle, configured to request speed-ratio range selection in the transmission by receiving an input signal having a duration and generating an output signal having the duration of the input signal; and a controller in operative communication with each of the switch and the transmission, programmed with a threshold speed of the engine and a threshold output signal duration, and configured to:

receive the output signal and compare the duration of the output signal with the threshold output signal duration;

determine a current speed of the engine and a current road speed of the vehicle;

determine a currently selected speed-ratio range in the transmission corresponding to the determined current speed of the engine and current road speed of the vehicle;

determine a threshold speed-ratio range in the transmission that is defined by the threshold speed of the engine;

command the transmission to change from the currently selected speed-ratio range by one to the next speed-ratio range if the threshold output signal duration is less than or equal to the threshold signal duration; and command the transmission to change from the currently selected speed-ratio range to the threshold speed-ratio range if the threshold output signal duration is greater than the threshold signal duration.

12. The system of claim 11, wherein:
the input signal is a request for the transmission to upshift;
the threshold speed of the engine is a minimum permitted engine speed; and
the threshold speed-ratio range includes a lowest permitted transmission speed-ratio.

13. The system of claim 12, wherein the controller is further configured to deny an additional request for the transmission to upshift following the command to the transmission to change the currently selected speed-ratio range to the threshold speed-ratio range.

14. The system of claim 13, wherein the controller is additionally configured to generate a signal indicative of the additional request for the transmission to upshift having been denied.

15. The system of claim 11, wherein:
the input signal is a request for the transmission to downshift;
the threshold speed of the engine is a maximum permitted engine speed; and
the threshold speed-ratio range includes a highest permitted transmission speed-ratio.

16. The system of claim 15, wherein the controller is further configured to deny an additional request for the transmission to downshift following the command to the transmission to change the currently selected speed-ratio range to the threshold speed-ratio range.

17. The system of claim 16, wherein the controller is additionally configured to generate a signal indicative of the additional request for the transmission to downshift having been denied.

18. The system of claim 11, further comprising a transmission shift selector configured to control operation of the transmission, and wherein the switch is arranged on the transmission shift selector.

19. The system of claim 11, wherein the vehicle includes a steering column and a steering wheel rotatably mounted on the steering column, and wherein the switch is arranged on one of the steering wheel and the steering column.

20. The system of claim 11, wherein the threshold duration for the input signal is in the range of 500-1000 milliseconds.

* * * * *